United States Patent
Norsk et al.

(10) Patent No.: US 8,431,099 B2
(45) Date of Patent: Apr. 30, 2013

(54) PROCESS AND APPARATUS FOR PURIFICATION OF AN EXHAUST GAS FROM AN INTERNAL COMBUSTION ENGINE

(75) Inventors: Jesper Norsk, Humlebæk (DK); Keld Johansen, Frederikssund (DK); Niels Poul Dalskov, Hellerup (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 13/496,903

(22) PCT Filed: Oct. 26, 2010

(86) PCT No.: PCT/EP2010/006531
§ 371 (c)(1),
(2), (4) Date: Mar. 19, 2012

(87) PCT Pub. No.: WO2011/050940
PCT Pub. Date: May 5, 2011

(65) Prior Publication Data
US 2012/0183460 A1    Jul. 19, 2012

(30) Foreign Application Priority Data
Oct. 28, 2009    (DK) .................................. 2009 01167

(51) Int. Cl.
*B01D 53/94* (2006.01)
*F01N 3/24* (2006.01)
*F01N 3/28* (2006.01)

(52) U.S. Cl.
USPC ................ 423/213.2; 423/213.7; 502/527.24; 60/299

(58) Field of Classification Search ............... 423/213.2, 423/213.7; 502/527.24; 60/299
See application file for complete search history.

(56) References Cited

U.S. PATENT DOCUMENTS

| | | | | |
|---|---|---|---|---|
| 4,280,926 | A * | 7/1981 | Abe et al. ..................... | 502/159 |
| 5,604,174 | A * | 2/1997 | Friedman et al. ............. | 502/439 |
| 5,651,946 | A | 7/1997 | Dekumbis et al. | |
| 6,534,021 | B1 * | 3/2003 | Maus ............................ | 422/180 |
| 6,845,612 | B2 * | 1/2005 | Jobson et al. .................. | 60/301 |
| 7,585,478 | B2 * | 9/2009 | Shirahata et al. ............. | 423/213.5 |
| 8,323,600 | B2 * | 12/2012 | Thogersen .................... | 423/213.2 |

FOREIGN PATENT DOCUMENTS
EP            1 016 777 A2    7/2000

* cited by examiner

*Primary Examiner* — Timothy Vanoy
(74) *Attorney, Agent, or Firm* — Dickstein Shapiro LLP (57) ABSTRACT

The invention provides a process for purification of an exhaust gas comprising nitrogen oxides, carbon monoxide, hydrocarbons and particulate matters from an internal combustion engine comprising the step of contacting the exhaust gas with one or more catalysts on one or more cross corrugated wire mesh sheets (5) being arranged between two or more gas impermeable cross corrugated sheets (4). The exhaust gas is contacted with one or more catalysts being coated in different zones on the one or more cross corrugated wire mesh sheets (5). Particulate matters in the exhaust gas are retained in a zone of the gas impermeable sheets (4), where the zone is porous and optionally coated with an oxidation catalyst. The exhaust gas from the combustion engine can be heated by the purified exhaust gas. The invention further comprises an apparatus for the purification process of an exhaust gas from an internal combustion engine.

22 Claims, 6 Drawing Sheets

PROCESS AND APPARATUS FOR PURIFICATION OF AN EXHAUST GAS FROM AN INTERNAL COMBUSTION ENGINE

The invention relates to purification of an exhaust gas from an internal combustion engine.

The invention is specifically directed to removal of nitrogen oxides, carbon monoxide, hydrocarbons and particulate matter, by directing the gas through catalyst coated wire mesh and porous walls.

The invention is technically and commercially useful for purification of exhaust gas especially from diesel driven vehicles.

Several exhaust gas purification processes and apparatus are already known.

U.S. Pat. No. 6,845,612 B2 discloses an apparatus, where nitrogen oxides are removed from exhaust gas by passing the gas through channels, which are covered by catalyst. The channels are formed by folding catalyst coated metal plates.

Another purification apparatus is described in US 2006/0 096 282. The exhaust gas flows in spaces between plane plates, which are partially filled or coated with one or more catalysts. Inlet gas flows in every second space, at the end of the device the gas flows into a chamber and turns direction and flows back through the other spaces. Fuel or oxygen containing gas can be introduced to the gas in the chamber, thus an oxidation catalyst can be installed in the outlet spaces. The catalyst is complicated to install and it will create pressure drop or the catalyst has a limited surface.

In U.S. Pat. No. 6,534,021 a filter is shown with alternating layers of gas impermeable plates and wire mesh plates. The gas impermeable plates can be plane, then the wire mesh plates are corrugated, or the gas impermeable plates are corrugated and the wire mesh plates are plane. The gas flows perpendicularly on the channels, which are formed by the corrugation. This however requires some space. Both the wire mesh and the filter body can be catalytically coated. In addition, only a single and corrugated layer can be provided in between the impermeable plates.

Patent application WO-A-2007/122283 discloses a substrate for the treatment of exhaust gases having an alternating corrugated sheet arranged in between flat wire mesh sheets. The depressions of the corrugated sheet match the depressions of the flat wire mesh sheet. The corrugated and flat wire mesh sheets (2) are permeable and corrugated only in one direction and are necessary to avoid the alternating V-shaped sheets (3) from falling onto another. Sheets (3) are thus corrugated, not cross-corrugated and only a single of these sheets (3) can be provided in between the permeable sheets (2).

It is an object of the invention to provide a method and an apparatus for removal of nitrogen oxides, carbon monoxide, hydrocarbons and particulate matter from exhaust gas in a small apparatus, where good contact between the exhaust gas and the catalyst is obtained, where the created pressure drop is low, and where the lay-out is a flexible, so more than one process can be performed in an apparatus of present invention including heat exchange.

The invention provides a process and apparatus for purification of an exhaust gas comprising nitrogen oxides, carbon monoxide, hydrocarbons and particulate matters from an internal combustion engine. The process taking place in the apparatus comprises the step of contacting the exhaust gas with one or more catalysts on one or more cross corrugated wire mesh sheets being arranged between two or more gas impermeable cross corrugated sheets. The exhaust gas is contacted with one or more catalysts being coated in different zones on the one or more cross corrugated wire mesh sheets. Particulate matters in the exhaust gas are retained in a zone of the gas impermeable sheets, where the zone is porous and optionally coated with an oxidation catalyst. The exhaust gas from the combustion engine can be heated by the purified exhaust gas.

Thereby, improved cleaning of exhaust gas is obtained by the invention, due to high turbulence in the gas, which provides close contact between gas and catalyst resulting in reduced space requirement and simultaneously reduced created pressure drop, as well as flexible choice of cleaning processes.

Because of the cross corrugation it is possible now to stack a plurality of wire mesh sheets between the gas impermeable cross corrugated sheets.

Exhaust gas from an internal combustion engine contains toxic impurities. Especially Diesel exhaust gas contains nitrogen oxides, carbon monoxide, hydrocarbons, soot and particulate matter.

The nitrogen oxides must be reduced to free nitrogen, the particles must be caught in a filter, and the caught particulate matters, the hydrocarbons and the carbon monoxide must be oxidised to carbon dioxide and water. These processes take place in the presence of catalysts.

The invention provides a method and apparatus for removal of these impurities, and comprises a compact multifunctional diesel exhaust unit, which further may include heat exchange.

The purification unit is composed of cross corrugated metal sheets, some of the sheets are gas impermeable sheets, and between these impermeable sheets are placed a number of cross corrugated wire mesh sheets. Part of the impermeable sheets may be porous. The corrugation pattern is a kind of zigzag pattern, and when the sheets are stacked in accordance with the invention, all sheets can be stacked directly on each other without any liner between and without collapsing but maintaining the flow channels.

Hence, not only one but several cross corrugated wire mesh sheets can be provided between two or more gas impermeable cross corrugated sheets. This enables a more flexible construction and enables that more catalyst can be coated.

It would be understood that contrary to the corrugated sheet (3) of WO-A-2007/122283 which is flat at its top, the wire mesh sheet of the present invention is cross corrugated and thereby its top is not flat but corrugated. A zigzag or wave-like pattern exists not only in one direction of the sheet.

One or more zones of the cross corrugated sheets can be coated with catalysts. The catalysts are typically applied on the sheets by spraying.

The fabricated wire mesh sheets are identical. When every second sheet is turned upside down, the slanted channels will touch each other in a non-parallel mode, and the sheets will thereby keep distance from each other.

The sheets are stacked as above and then inserted in a housing to form the purification unit. The gas flows in channels, the channels are formed by the corrugation, however, the zigzag pattern forces the gas to often change direction to some extend. This creates a turbulent flow and the contact between catalyst and gas is considerably improved. At the same time, flow through wire mesh does not create excessive pressure drop.

The gas impermeable sheets can in one end be flat and porous and in every second space the brims are sealed together by means of wires. Soot combustion catalyst can be applied on this porous part of the sheets. These porous parts of the sheets form the soot filter in the purification unit. The gas flows from every second space to the other spaces in one end of the plates. In this embodiment the porous part of the impermeable sheets may be flat.

When the gas, as described above, flows through every second space between the gas impermeable sheets, the unit can be provided with a chamber, where the gas flows out and turns flow direction and flows back through the other spaces. In this embodiment also a feed/effluent heat exchange function can be built in the purification unit of the invention. In this case, a zone of the sheets at the inlet/outlet end of the unit are not catalytically coated, and heat will go through the metal sheets with a much higher heat transfer coefficient compared to coated sheets.

The gas impermeable sheets are sealed together by metal threads placed along the sides in the flow direction. The threads have approximately the same diameter as the distance between the gas impermeable sheets.

In the embodiment, where the gas turns around in a chamber, every second space between the gas impermeable sheets at the inlet/outlet end are sealed as well, and a short part of the corresponding side is left open. This opening forms the gas exit. The gas will then flow into the unit at one end and out at the side of the unit at the same end—or opposite.

At the outlet end, the corrugated wire mesh sheets are a little shorter than the gas impermeable sheets.

In the embodiments, where the gas is filtrated before entering the turning chamber, the spaces between the gas impermeable sheets with the un-filtrated gas are also sealed with metal threads at the end of the turning chamber.

In another embodiment hydrocarbon can be introduced at the inlet of the purification unit and mixed with the exhaust gas in an inlet chamber. The mixed gas then flows to the part of the wire mesh, which is coated with oxidation catalyst, and the carbon monoxide, and hydrocarbons will be exothermal oxidised. In this way the temperature is increased, when needed downstream, f. inst, for soot combustion on the filter or for temperature increase at cold start of engine.

In the turning chamber described above, reducing agent, such as an aqueous solution of urea, ammonia, aqueous solution of ammonia, cyanuric acid, ammelide, ammeline, ammonium cyanate, biuret, ammonium carbamate, ammonium carbonate, ammonium formate, melamine, or tricyanourea can be injected, and mixed with the oxidised gas, in which nitrogen oxides then can be selectively, catalytically reduced to free nitrogen by passing a zone coated with SCR-catalyst. Optionally, possible remains of reducing agent, slip, can be oxidised in another catalysed zone, before the gas flows out.

By this integrated design, the processes below can take place in this compact unit:
HC-injection-catalytically diesel oxidation-retaining particles in a catalytically coated filter-urea injection-selective catalytic reduction of nitrogen oxides-catalytic oxidation of ammonia slip.
or:
feed heat exchange-HC-injection-catalytically diesel oxidation-retaining particles in a catalytically coated filter-urea injection-selective catalytic reduction of nitrogen oxides-catalytic oxidation of ammonia slip-effluent heat exchange.

In another embodiment of the invention, the process will comprise the steps of
urea injection-selective catalytic reduction of nitrogen oxides-catalytic oxidation of ammonia slip-HC-injection-catalytically diesel oxidation-retaining particles in a catalytically coated filter
or
feed heat exchange-urea injection-selective catalytic reduction of nitrogen oxides-catalytic oxidation of ammonia slip-HC-injection-catalytically diesel oxidation-retaining particles in a catalytically coated filter-effluent heat exchange.

In this case the gas enters the unit from the side.

In another embodiment of the invention, the process will comprise the steps of
urea injection-selective catalytic reduction of nitrogen oxides-catalytic oxidation of ammonia slip-retaining particles in a catalytically coated filter-HC-injection-catalytically diesel oxidation.
or
feed heat exchange-urea injection-selective catalytic reduction of nitrogen oxides-catalytic oxidation of ammonia slip-retaining particles in a catalytically coated filter-HC-injection-catalytically diesel oxidation-effluent heat exchange.

The cross corrugated wire mesh sheets are coated with catalysts, which are applied in zones.

The oxidation catalyst comprises platinum and/or palladium on rare earths promoted aluminium oxide or platinum and/or palladium on silicon oxide or on promoted titanium oxide. It can also be platinum and/or palladium on zirconium oxide promoted cerium oxide or mixtures of copper and manganese oxides or palladium on a mixture of copper and manganese oxides.

The porous filter is coated with mixed oxides of rare earths, aluminium and zirconium, optionally with palladium and/or platinum.

The catalyst for SCR (selective catalytic reduction) is vanadium oxide on titanium oxide with possible addition of tungsten or molybdenum oxide. It can also be a zeolite catalyst comprising copper and/or iron on zeolite, which is modified beta zeolite, ZSM-5 or chabazite. Or it could be a functionalized acidic base metal mixed oxide catalyst comprising acidic cerium-zirconium oxides mixtures and zirconium-titanium oxides mixtures.

The catalyst for oxidising possible remains of reductant, "ammonia slip catalyst", is precious metals as platinum or palladium optionally on with zeolite, SCR zeolites, aluminium oxides, rare earths oxides or silicon oxide promoted aluminium oxide, cerium oxide, zirconium oxide or mixtures hereof.

However, most typically is used a catalyst with platinum and/or palladium on rare earth promoted alumina for the oxidation, and a selective catalytically reducing (SCR) catalyst with vanadium and/or tungsten oxide on titanium oxide or iron and/or copper on zeolite. For the ammonia slip catalyst is used platinum and/or palladium on zeolite, and the filter catalyst is typical palladium and/or platinum on mixed oxides of rare earth and zirconium.

The most used zeolites are ZSM-5 zeolite, (3-zeolite and chabazite.

By the process of the invention, a conversion of 80-99.9% of hydrocarbons, carbon monoxide, nitrogen oxides and particulate matters can be obtained.

Figure 1:
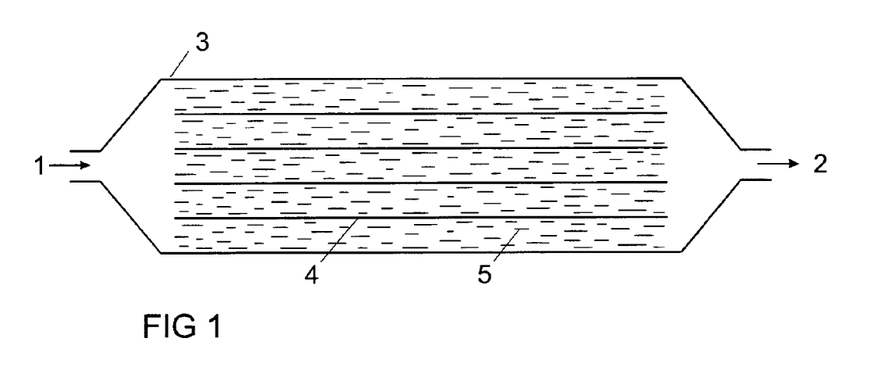
FIG. 1 is a schematic drawing of a cross section of one embodiment of the invention.

One embodiment of the invention is shown in FIG. 1, where exhaust gas 1 from a combustion engine flows into the housing 3 of the purification unit and flows out as clean exhaust gas 2. Inside the housing 3, cross corrugated gas impermeable metal sheets 4 are installed, parallel to each other. In each space between the impermeable sheets 4 a number of cross corrugated wire mesh sheets 5 are placed.

Figure 2:
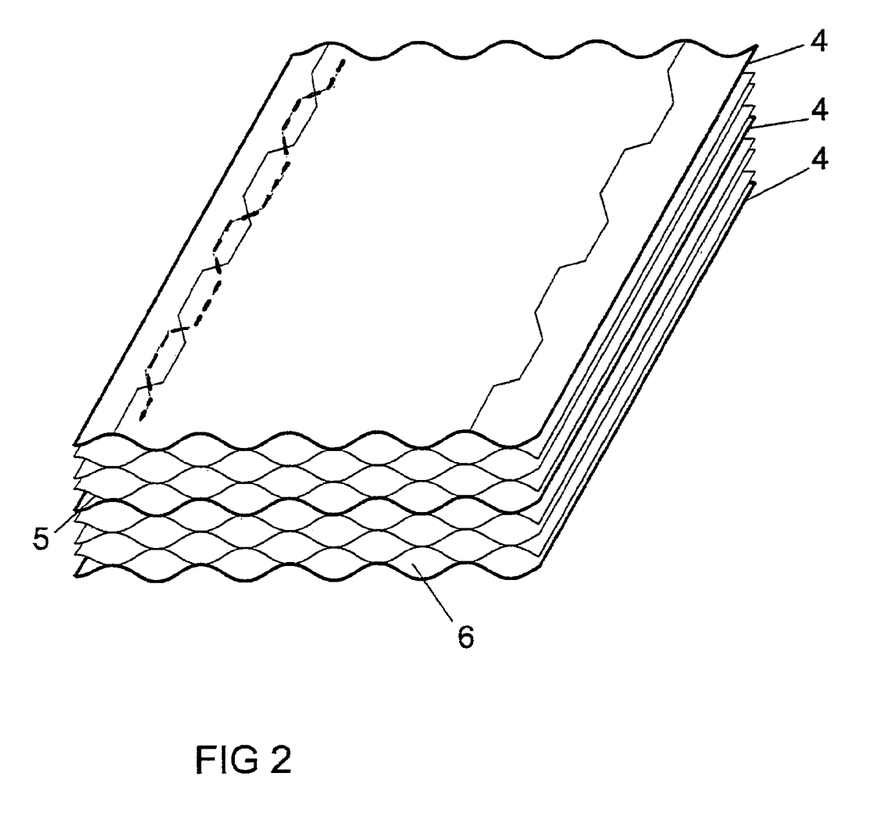
FIG. 2 is a schematic drawing of the layers in the cleaning unit of the invention showing the corrugation on two directions.

The sheets are shown in more detail in FIG. 2, where it is seen that wire mesh plates 5 are placed in each space between the impermeable sheets 4. The corrugated pattern forms channels 6. However, each channel comprises two half channels, each have a zigzag shape, but they cross each other so they support each other, and simultaneously they create turbulent gas flow. The stippled lines show the cross corrugation of the sheet underneath.

Figure 3:
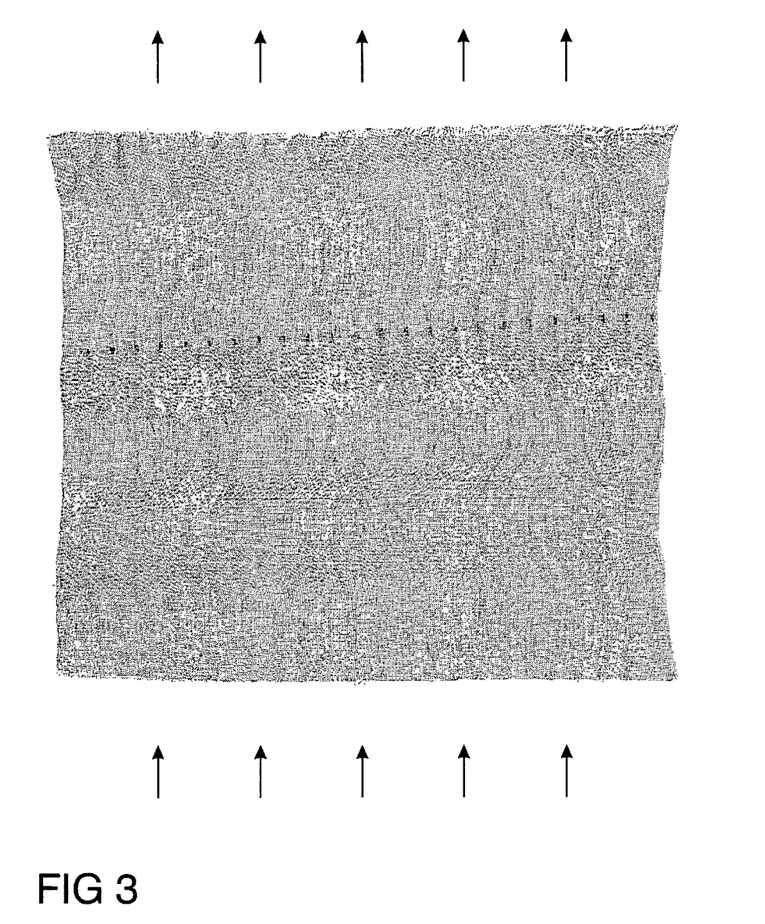
FIG. 3 is a photo of a wire mesh sheet of the invention.

FIG. 3 is a picture of a wire mesh sheet, and the arrows indicate the gas flow direction. From this it can be seen that the pattern of the cross corrugated sheets forms parallel channels, each channel consists of a repeated shape. The shape is a first straight channel continuing in a second straight channel forming a first angle with the first channel and continuing in a third channel being parallel to the first channel and continuing in a fourth channel forming with the first channel a second angle of same size, but opposite direction as the first angle. The cross corrugated sheets are thus corrugated in two directions making an angle with each other.

Figure 4A:
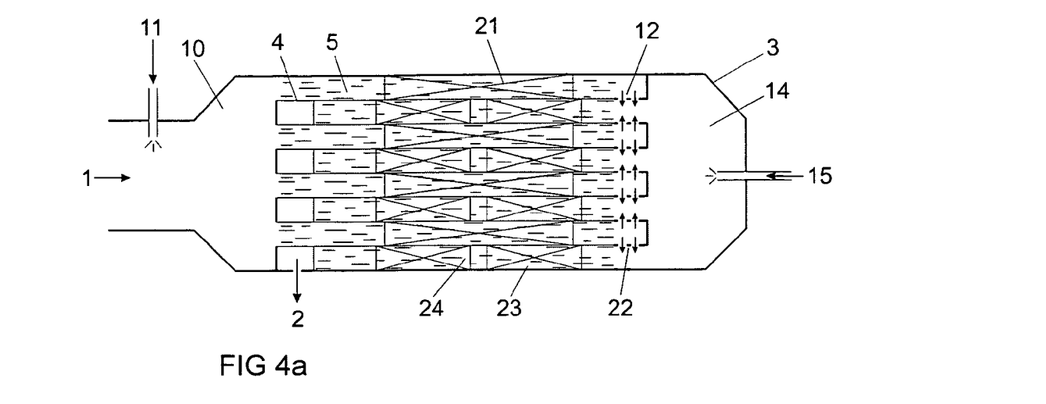
FIGS. 4a, b and c are schematic drawings of a cross section of two embodiments of the invention.

One embodiment of the invention is shown in FIG. 4a. The exhaust gas 1 from an engine flows to inlet chamber 10, from where it flows to every second space between the impermeable cross corrugated sheets 4 in the housing 3. Hydrocarbon 11 is injected to the inlet chamber 10. In each space between the impermeable sheets 4, a number of cross corrugated wire mesh sheets 5 are installed and through which the mixed gas flows. A wire mesh zone is coated with diesel oxidation catalyst 21, where hydrocarbons, carbon monoxide and particulate matter are oxidised. The ends 12 of the sheets are porous and coated with a combustion catalyst 22, which form a filter for the gas, and where retained particulate matter is catalytically combusted. In the chamber 14 reducing agent 15 is introduced and mixed with the oxidised, filtrated exhaust gas, the mixed gas then passes a zone of the wire mesh, which is coated with catalyst 23 for selective catalytic reduction of nitrogen oxides to nitrogen. Further down stream the wire mesh sheets 5 can be coated with a slip catalyst 24, which oxidises remains of reducing agent 15. The gas flows out through the side of the unit and leaves it as purified exhaust gas 2.

Figure 4B:
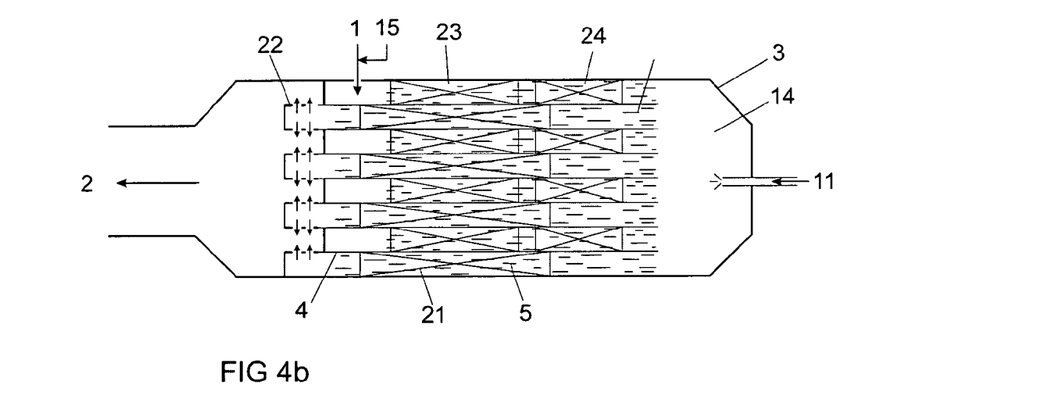

Another embodiment of the invention is shown in FIG. 4b and with another process. The exhaust gas 1 from an engine is mixed with reducing agent 15 and flows to inlet at the side of the purification unit, from where it flows to a zone of the wire mesh, which is coated with catalyst 23 for selective catalytic reduction of nitrogen oxides to nitrogen. This is followed by wire mesh sheets 5, which are coated with a slip catalyst 24, which oxidises remains of reducing agent 15. In the chamber 14 hydrocarbon 11 is injected and mixed with the exhaust gas before flowing through the corrugated wire mesh zone coated with diesel oxidation catalyst 21, where hydrocarbons, carbon monoxide and possible remains of reducing agent are oxidised. Downstream of the oxidation catalyst 21 the impermeable sheets are porous and coated with a combustion catalyst 22, which form a filter for the gas, and where retained particulate matter is catalytically combusted.

Figure 4C:
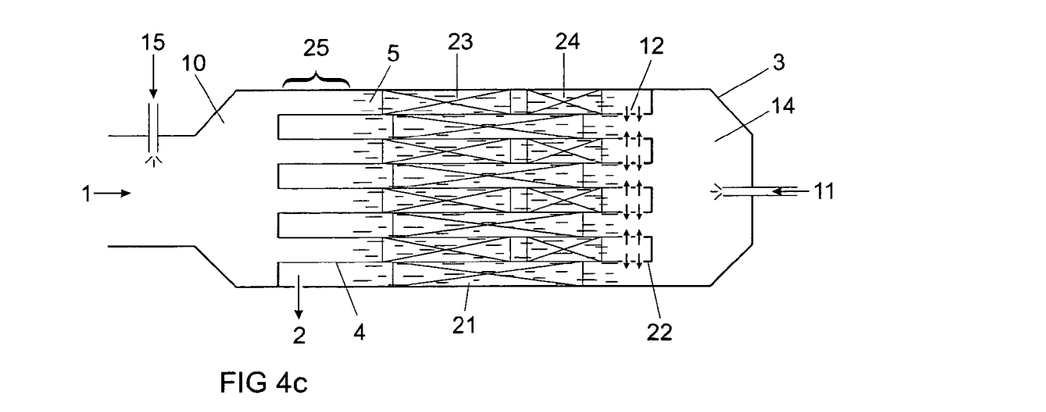

Yet another embodiment of the invention is shown in FIG. 4c and with another process. The exhaust gas 1 from an engine is mixed with reducing agent 15 and flows to inlet at the side of the purification unit, from where it flows to a heat exchange zone 25, where the sheets are without catalytic coating. In zone 25 the feed gas is heated by the purified gas leaving the unit. The mixed, heated exhaust gas then passes of the wire mesh sheets, which are coated with catalyst 23 for selective catalytic reduction of nitrogen oxides to nitrogen. This is followed by a zone of the wire mesh sheets 5, which is coated with a slip catalyst 24, which oxidises remains of reducing agent 15. Downstream of the slip oxidation catalyst 24 a zone 12 of the impermeable sheets are porous and coated with a combustion catalyst 22, which forms a filter for the gas, and where retained particulate matter is catalytically combusted. In the chamber 14 hydrocarbon 11 is injected and mixed with the exhaust gas before flowing through the corrugated wire mesh zone coated with diesel oxidation catalyst 21, where hydrocarbons, carbon monoxide and possible remains of reducing agent are oxidised. The oxidation creates heat, and the heated, purified exhaust gas heats the exhaust gas 1 from the engine in the heat exchange zone 25 before leaving the apparatus as purified exhaust gas 2.

Figure 5A:
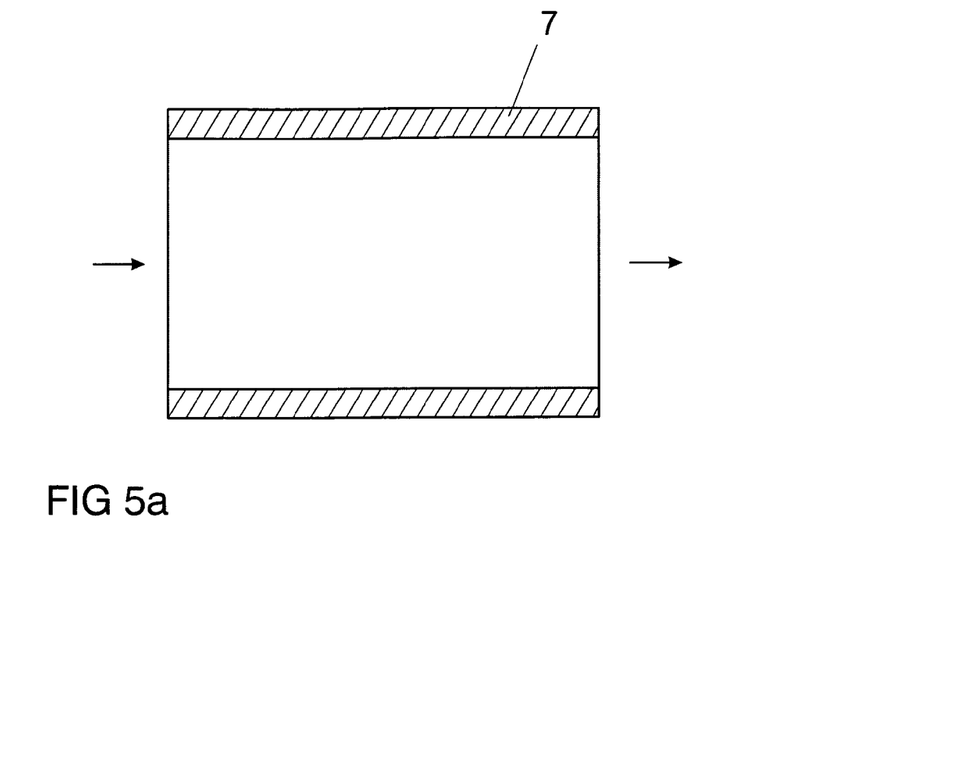
FIGS. 5a and b are schematic drawings of impermeable sheets with sealing wires of the invention.
Figure 5B:
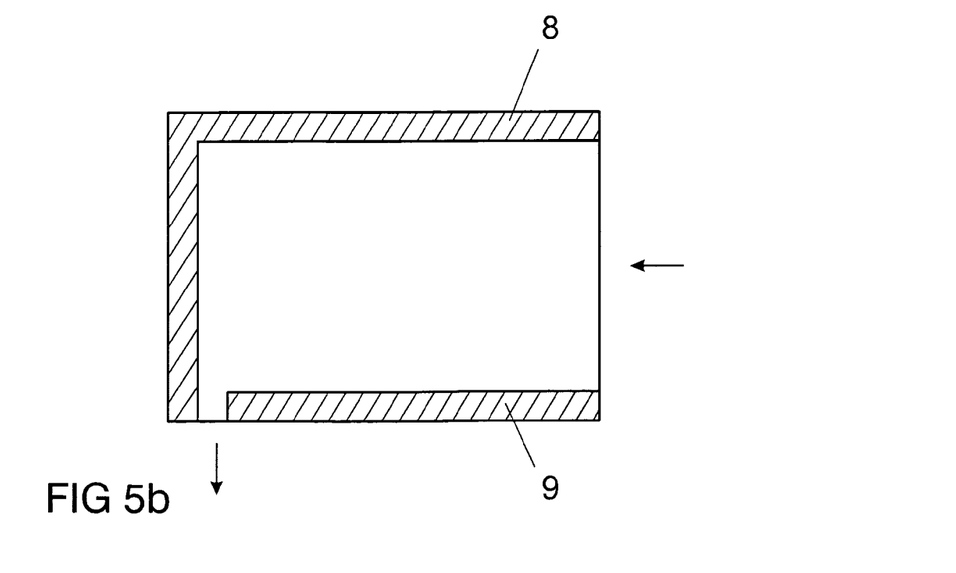

FIG. 5a shows an impermeable sheet with a sealing metal wire 7 on each rim along the flow direction. Between two sheets with this sealing between them, the gas flows straight through the unit. Whereas, FIG. 5b shows sealing wire 8 along the rim in the flow direction and one end, and sealing wire 9 along the most of other rim in the flow direction, so it leaves a hole at the sealed end. Between two impermeable sheets with this sealing between them, the gas enters at one end and flows out at the side at the other end.

Figure 6:
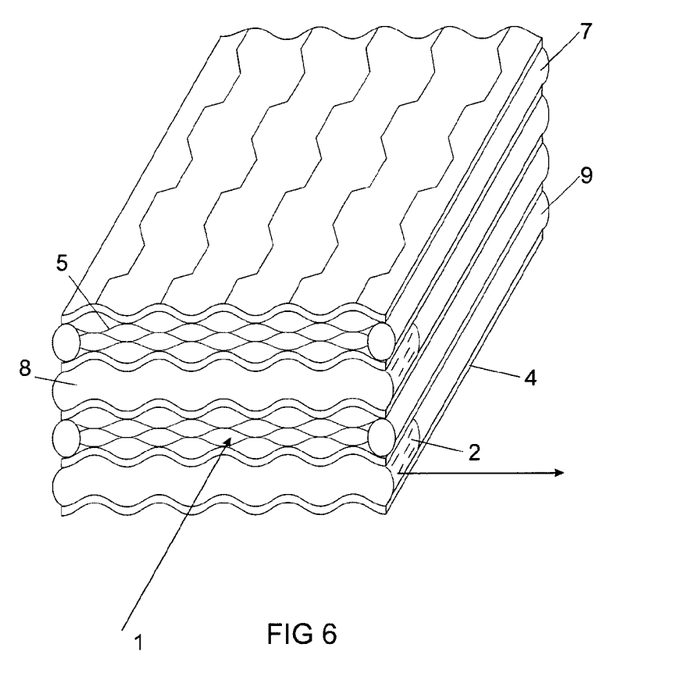
FIG. 6 is a schematic drawing of the internal of invention.

Also in FIG. 6 these sealing wires 7, 8 and 9 are shown, but between a number of impermeable sheets 4, which again contain a number of cross corrugated wire mesh sheets 5. This perspective drawing shows how the inlet gas 1 can enter between every second space, and how the outlet gas 2 leaves the other paths at the same end, but at the side of the unit.

Figure 7:
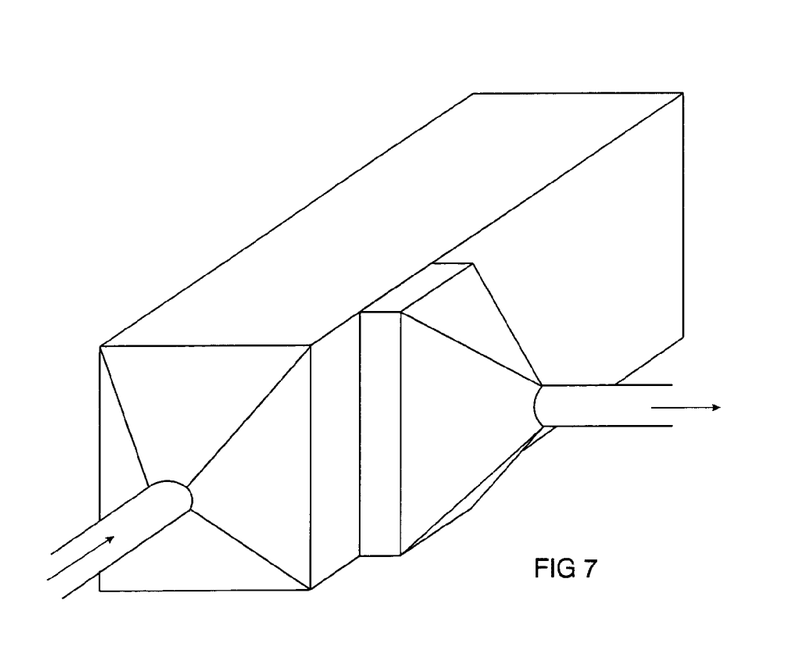
FIG. 7 is a schematic drawing of the shape of the invention.

All the sheets are installed in a housing, which is shown in FIG. 7. The figure shows the embodiment of the unit, where the gas enters and leaves the unit at the same end.

The features of the invention are:
1. A process for purification of an exhaust gas comprising nitrogen oxides, carbon monoxide, hydrocarbons and particulate matters from an internal combustion engine comprising the step of
   contacting the exhaust gas with one or more catalysts on one or more cross corrugated wire mesh sheets being arranged between two or more gas impermeable cross corrugated sheets.
2. A process according to feature 1, wherein the exhaust gas is contacted with one or more catalysts being coated in different zones on the one or more cross corrugated sheets.
3. A process according to feature 1 or 2, wherein particulate matters in the exhaust gas are retained in a zone of the gas impermeable sheets, the zone being porous and optionally coated with an oxidation catalyst.
4. A process according to features 1-3, wherein the exhaust gas from the combustion engine and the purified exhaust gas are in heat exchange relationship with each other.
5. A process according to features 1-4, wherein the exhaust gas from the combustion engine is purified by the successive steps of
   Injecting a hydrocarbon into the exhaust gas;
   catalytically oxidising of the exhaust gas and the hydrocarbon;
   passing the exhaust gas through a catalytically coated filter, and oxidising particulate matters;
   injecting a reducing agent;
   selective, catalytic reducing nitrogen oxides in the oxidised, filtered exhaust gas by the reducing agent to nitrogen;
   catalytic oxidising remains of the reducing agent; and
   withdrawing a purified exhaust gas stream.

6. A process according to features 1-4, wherein the exhaust gas from the combustion engine is purified by the successive steps of
   injecting a reducing agent;
   selective, catalytic reducing nitrogen oxides in the oxidised, filtered exhaust gas by the reducing agent to nitrogen;
   catalytic oxidising remains of the reducing agent;
   injecting a hydrocarbon into the exhaust gas;
   catalytic oxidising the exhaust gas and the hydrocarbon;
   passing the exhaust gas through a catalytically coated filter, and oxidising particulate matters; and
   withdrawing a purified exhaust gas stream.
7. A process according to features 1-4, wherein the exhaust gas from the combustion engine is purified by the successive steps of
   injecting a reducing agent;
   selective, catalytic reducing nitrogen oxides in the exhaust gas by the reducing agent to nitrogen;
   catalytic oxidising remains of the reducing agent;
   passing the exhaust gas through a catalytically coated filter, and oxidising particulate matters;
   injecting of hydrocarbon into the exhaust gas;
   catalytic oxidising the exhaust gas and the hydrocarbon; and
   withdrawing a purified exhaust gas stream.
8. A process according to features 5-7, wherein the hydrocarbon is the fuel to the engine, and the reducing agent is an aqueous solution of urea, ammonia, an aqueous solution of ammonia.
9. A process according to features 5-8, wherein the oxidation takes place in the presence of a catalyst being platinum and/or palladium on rare earth promoted alumina;
   the filter is coated with a catalyst being palladium and/or platinum on mixed oxides of rare earth and zirconium;
   the selective catalytic reduction takes place in the presence of a catalyst being vanadium and/or tungsten oxide on titanium oxide or iron and/or copper on zeolite; and
   the remains of reducing agent is oxidised by a catalyst being platinum on zeolite, palladium on zeolite, or platinum and palladium on zeolite.
10. An apparatus for purification of an exhaust gas from an internal combustion engine according to any of the preceding claims, wherein the apparatus comprises within a housing
    two or more cross corrugated gas impermeable metal sheets installed in parallel with and spaced apart from each other in the housing
    one or more cross corrugated catalytically coated wire mesh sheets installed in each space between the gas impermeable metal sheets.
11. An apparatus according to feature 10, wherein each space between the cross corrugated impermeable metal sheets contains a plurality of cross corrugated catalytically coated wire mesh sheets stacked on each other.
12. An apparatus according to features 10-11, wherein the cross corrugated impermeable metal sheets are angle corrugated.
13. An apparatus according to features 10-12, wherein the pattern of the cross corrugated sheets forms parallel channels, each channel consists of a repeated shape, being
    a first straight channel, continuing in
    a second straight channel forming a first angle with the first channel and continuing in
    a third channel being parallel to the first channel and continuing in
    a fourth channel forming with the first channel a second angle of same size, but opposite direction as the first angle.
14. An apparatus according to features 10-13, wherein two or three rims of each impermeable metal sheets are sealed together by means of sealing wires along the rims in the flow direction, optionally in every second space a sealing wire is placed along one rim in the flow direction and an adjacent rim, and another sealing wire on a part of the other side in the flow direction and leaving space between this wire and the wire perpendicular to the flow direction in the apparatus.
15. An apparatus according to features 10-14, wherein the housing comprises an inlet chamber and an outlet chamber.
16. An apparatus according to features 10-14, wherein the housing comprises an inlet chamber and an outlet chamber in one end of the housing and a turning chamber in the other end of the housing, wherein the gas flows in one direction in every second space between the gas impermeable sheets and in the opposite direction in the other spaces.
17. An apparatus according to features 10-16, wherein the wire mesh sheets and optionally the impermeable metal sheets are catalytically coated in zones, each zone with a different catalyst.
18. An apparatus according to features 10-17, wherein a length of the gas impermeable sheets at one end are flat and porous and in every second space sealed together with sealing wires, optionally the porous part of the sheets is coated with a catalyst active in combustion of particulate matters.
19. An apparatus according to features 10-18, wherein a zone of the sheets at the inlet/outlet end of the unit are not catalytically coated, forming a heat exchange zone.
20. An apparatus according to features 18-19, comprising in following sequence
    means for injecting hydrocarbon into the exhaust gas;
    a first catalyst being active catalytically oxidising the exhaust gas and the hydrocarbon;
    a filter part of the gas impermeable sheets being coated with a second catalyst being active in combustion of particulate matters;
    means for injecting a reducing agent into a turning chamber;
    a third catalyst being active in selectively, catalytically reduction of the oxidised, filtered exhaust gas by the reducing agent; and
    a fourth catalyst active in catalytically oxidising remains of the reducing agent.
21. An apparatus according to features 18-19, comprising in following sequence
    means for injecting a reducing agent into the exhaust gas;
    a first catalyst being active in selectively, catalytically reduction of the exhaust gas by the reducing agent;
    a second catalyst active in catalytically oxidising remains of the reducing agent;
    means for injecting hydrocarbon into a turning chamber;
    a third catalyst being active catalytically oxidising the exhaust gas and the hydrocarbon; and
    a filter part of the gas impermeable sheets being coated with a fourth catalyst being active in combustion of particulate matters.
22. An apparatus according to features 18-19, comprising in following sequence
    means for injecting a reducing agent into the exhaust gas;
    a first catalyst being active in selectively, catalytically reduction of the exhaust gas by the reducing agent;
    a second catalyst active in catalytically oxidising remains of the reducing agent;

a filter part of the gas impermeable sheets being coated with a third catalyst being active in combustion of particulate matters;

means for injecting hydrocarbon into a turning chamber; and a fourth catalyst being active catalytically oxidising the exhaust gas and the hydrocarbon.

EXAMPLES

The filter unit of the invention is as below:
The corrugated sheets have a thickness of 0.1-0.2 mm.
The thickness of the wire of the wire mesh is 40-60 μm.
The wire mesh sheets typically have 100×100 mesh spaces per 6.45 $cm^2$.
The height of a corrugated sheet is 1.0-1.5 mm.
The size of the pores in the porous zone is 5-25 μm.
The plate thickness of the housing is 0.7-1.0 mm.
A filter will have a size of 2-5 l in a car and 5-20 l in a van.
One specific embodiment:
Cross corrugated gas impermeable metal sheets and cross corrugated wire mesh metal sheets were produced proving the stacking principle without collapsing of the wire mesh sheets. Sheets of 10 cm×10 cm were stacked with wire mesh sheets between the gas impermeable sheets. The wire of the wire mesh was 56 μm thick and the sheets had 100×100 mesh spaces per 6.45 $cm^2$. The waves formed by the corrugated pattern were 1.1 mm high.

The invention claimed is:

1. A process for purification of an exhaust gas comprising nitrogen oxides, carbon monoxide, hydrocarbons and particulate matters from an internal combustion engine comprising the step of contacting the exhaust gas with one or more catalysts on one or more cross corrugated wire mesh sheets being arranged between two or more gas impermeable cross corrugated sheets.

2. A process according to claim 1, wherein the exhaust gas is contacted with one or more catalysts being coated in different zones on the one or more cross corrugated sheets.

3. A process according to claims claim 1, wherein particulate matters in the exhaust gas are retained in a zone of the gas impermeable sheets, the zone being porous and optionally coated with an oxidation catalyst.

4. A process according to claims claim 1, wherein the exhaust gas from the combustion engine and the purified exhaust gas are in heat exchange relationship with each other.

5. A process according to claim 1, wherein the exhaust gas from the combustion engine is purified by the successive steps of
Injecting a hydrocarbon into the exhaust gas;
catalytically oxidising of the exhaust gas and the hydrocarbon;
passing the exhaust gas through a catalytically coated filter, and oxidising particulate matters;
injecting a reducing agent;
selective, catalytic reducing nitrogen oxides in the oxidised, filtered exhaust gas by the reducing agent to nitrogen;
catalytic oxidising remains of the reducing agent; and
withdrawing a purified exhaust gas stream.

6. A process according to claim 1, wherein the exhaust gas from the combustion engine is purified by the successive steps of
injecting a reducing agent;
selective, catalytic reducing nitrogen oxides in the oxidised, filtered exhaust gas by the reducing agent to nitrogen;
catalytic oxidising remains of the reducing agent; injecting a hydrocarbon into the exhaust gas;
catalytic oxidising the exhaust gas and the hydrocarbon;
passing the exhaust gas through a catalytically coated filter, and oxidising particulate matters; and
withdrawing a purified exhaust gas stream.

7. A process according to claim 1, wherein the exhaust gas from the combustion engine is purified by the successive steps of
injecting a reducing agent;
selective, catalytic reducing nitrogen oxides in the exhaust gas by the reducing agent to nitrogen;
catalytic oxidising remains of the reducing agent; passing the exhaust gas through a catalytically coated filter, and oxidising particulate matters;
injecting of hydrocarbon into the exhaust gas;
catalytic oxidising the exhaust gas and the hydrocarbon; and
withdrawing a purified exhaust gas stream.

8. A process according to claim 5, wherein the hydrocarbon is the fuel to the engine, and the reducing agent is an aqueous solution of urea, ammonia, an aqueous solution of ammonia.

9. A process according to claim 5, wherein the oxidation takes place in the presence of a catalyst being platinum and/or palladium on rare earth promoted alumina;
the filter is coated with a catalyst being palladium and/or platinum on mixed oxides of rare earth and zirconium;
the selective catalytic reduction takes place in the presence of a catalyst being vanadium and/or tungsten oxide on titanium oxide or iron and/or copper on zeolite; and the remains of reducing agent is oxidised by a catalyst being platinum on zeolite, palladium on zeolite, or platinum and palladium on zeolite.

10. An apparatus for purification of an exhaust gas from an internal combustion engine according to claim 1, wherein the apparatus comprises within a housing
two or more cross corrugated gas impermeable metal sheets installed in parallel with and spaced apart from each other in the housing
one or more cross corrugated catalytically coated wire mesh sheets installed in each space between the gas impermeable metal sheets.

11. An apparatus according to claim 10, wherein each space between the cross corrugated impermeable metal sheets contains a plurality of cross corrugated catalytically coated wire mesh sheets stacked on each other.

12. An apparatus according to claim 10, wherein the cross corrugated impermeable metal sheets are angle corrugated.

13. An apparatus according to claim 10, wherein the pattern of the cross corrugated sheets forms parallel channels, each channel consists of a repeated shape, being
a first straight channel, continuing in
a second straight channel forming a first angle with the first channel and continuing in
a third channel being parallel to the first channel and continuing in a fourth channel forming with the first channel a second angle of same size, but opposite direction as the first angle.

14. An apparatus according to claim 10, wherein two or three rims of each impeimeable metal sheets are sealed together by means of sealing wires along the rims in the flow direction, optionally in every second space a sealing wire is placed along one rim in the flow direction and an adjacent rim, and another sealing wire on a part of the other side in the flow direction and leaving space between this wire and the wire perpendicular to the flow direction in the apparatus .

15. An apparatus according to claim 10, wherein the housing comprises an inlet chamber and an outlet chamber.

16. An apparatus according to claim 10, wherein the housing comprises an inlet chamber and an outlet chamber in one end of the housing and a turning chamber in the other end of the housing, wherein the gas flows in one direction in every second space between the gas impermeable sheets and in the opposite direction in the other spaces.

17. An apparatus according to claim 10, wherein the wire mesh sheets and optionally the impermeable metal sheets are catalytically coated in zones, each zone with a different catalyst.

18. An apparatus according to claim 10, wherein a length of the gas impermeable sheets at one end are flat and porous and in every second space sealed together with sealing wires, optionally the porous part of the sheets is coated with a catalyst active in combustion of particulate matters.

19. An apparatus according to claim 10, wherein a zone of the sheets at the inlet/outlet end of the unit are not catalytically coated, forming a heat exchange zone.

20. An apparatus according to claim 10, comprising in following sequence
   means for injecting hydrocarbon into the exhaust gas;
   a first catalyst being active catalytically oxidising the exhaust gas and the hydrocarbon;
   a filter part of the gas impermeable sheets being coated with a second catalyst being active in combustion of particulate matters;
   means for injecting a reducing agent into a turning chamber;
   a third catalyst being active in selectively, catalytically reduction of the oxidised, filtered exhaust gas by the reducing agent; and
   a fourth catalyst active in catalytically oxidising remains of the reducing agent.

21. An apparatus according to claim 18, comprising in following sequence
   means for injecting a reducing agent into the exhaust gas;
   a first catalyst being active in selectively, catalytically reduction of the exhaust gas by the reducing agent;
   a second catalyst active in catalytically oxidising remains of the reducing agent;
   means for injecting hydrocarbon into a turning chamber;
   a third catalyst being active catalytically oxidising the exhaust gas and the hydrocarbon; and
   a filter part of the gas impermeable sheets being coated with a fourth catalyst being active in combustion of particulate matters.

22. An apparatus according to claim 18, comprising in following sequence
   means for injecting a reducing agent into the exhaust gas;
   a first catalyst being active in selectively, catalytically reduction of the exhaust gas by the reducing agent;
   a second catalyst active in catalytically oxidising remains of the reducing agent;
   a filter part of the gas impermeable sheets being coated with a third catalyst being active in combustion of particulate matters;
   means for injecting hydrocarbon into a turning chamber; and
   a fourth catalyst being active catalytically oxidising the exhaust gas and the hydrocarbon.

\* \* \* \* \*